United States Patent [19]

Katou et al.

[11] Patent Number: 5,341,620
[45] Date of Patent: Aug. 30, 1994

[54] CAN FEEDING APPARATUS FOR A CAN SEAMER

[75] Inventors: Naoyoshi Katou; Seiki Tamiya; Masateru Takahara, all of Nagoya, Japan

[73] Assignees: Mitsubishi Jukogyo Kabushiki Kaisha, Tokyo; Churyo Engineering Kabushiki Kaisha, Aichi, both of Japan

[21] Appl. No.: 968,572

[22] Filed: Oct. 29, 1992

[30] Foreign Application Priority Data

| Oct. 30, 1991 | [JP] | Japan | 3-310203 |
| Nov. 25, 1991 | [JP] | Japan | 3-334600 |
| Jan. 10, 1992 | [JP] | Japan | 4-020753 |
| Jan. 10, 1992 | [JP] | Japan | 4-020754 |

[51] Int. Cl.$^5$ ............... B65B 43/50; B65B 43/52
[52] U.S. Cl. ................. 53/287; 53/314; 413/45; 413/46; 413/50; 198/480.1; 198/633; 198/690.1
[58] Field of Search .......... 198/473.1, 803.11, 690.1, 198/480.1, 479.1, 633, 723; 413/46, 45, 52, 50; 53/334, 306, 308, 314, 287, 338

[56] References Cited
U.S. PATENT DOCUMENTS

| 2,345,870 | 4/1944 | Guenther | 198/480.1 |
| 3,717,236 | 2/1973 | New | 198/480.1 X |
| 3,754,635 | 8/1973 | Mojden | 198/690.1 X |
| 4,709,800 | 12/1987 | Olsen | 198/633 X |
| 4,721,200 | 1/1988 | Dugan | 198/480.1 X |
| 5,165,527 | 11/1992 | Garbagnati | 198/690.1 X |

FOREIGN PATENT DOCUMENTS 0401698 12/1990 European Pat. Off. ......... 198/479.1

Primary Examiner—Horace M. Culver
Attorney, Agent, or Firm—Wenderoth, Lind & Ponack

[57] ABSTRACT

The present invention provides a can feeding apparatus for a can seamer, in which can bodies are fed to a seaming turret are slid on a plate rail and alongside opposed guides by fingers of a drive chain. The seaming turret or a turret opposed to the seaming turret, or both turrets, are provided with claws at their outer circumferential portions. The claws project radially outwardly of pitch circles of the turrets and these projecting portions have profiles of cycloids so that the turrets will not pierce the can bodies. A plate-shaped magnet and/or a brush are disposed on the guides to steady the can bodies as they are transferred to a can lifter of the seaming turret. Furthermore, the angular position of a conveyor sprocket of the can feed conveyor can be adjusted easily in a short period of time by a phase adjusting device. Still further, in a can lid feeder disposed in front of the can seamer, a can body centering turret is also provided with projecting portions having profiles of cycloids.

10 Claims, 15 Drawing Sheets

CAN FEEDING APPARATUS FOR A CAN SEAMER

BACKGROUND OF THE INVENTION

1. Field of the Invention

The present invention relates to a can feeding apparatus which can convey cans stably from a can filler to a can lid feeder and a can seamer in a canned food production line.

2. Description of the Prior Art

A layout of the heretofore known portion of the canned food production line associated with a can seamer, that is, an arrangement of the respective machines from a can feed conveyor upstream of the can seamer to an ejection turret, is shown in FIG. 14. In this arrangements, can bodies 1 filled by a can filler (not shown) are conveyed in the direction of arrow A by means of a can feed conveyor 3 and fed into a seaming turret 7. The can feed conveyor 3 slides the can bodies 1 at a fixed pitch along a guide 6 and upon a rail 5 by means of a finger-associated roller chain 4.

In the outer circumferential portion of the seaming turret 7 are provided a large number of semi-circular recesses 7a conformed to the can body 1, and the can bodies 1 are received in these recesses 7a. In addition, an opposed turret 8 having recesses 8a of the same shape as the recesses 7a is disposed contiguously to the seaming turret 7 so that the recess 7a and the recess 8a jointly hold a can body 1 at a proper position on a straight line F—F connecting the centers of both turrets.

The can bodies 1 and can lids 2 in the seaming turret 7 are seamed by means of a seaming roll (not shown). Subsequently, the seamed cans are carried out of the can seaming via an ejection turret 9. It is a matter of course that the above-mentioned filler, seaming turret 7, opposed turret 8, ejection turret 9 and can feed conveyor 3 are synchronously operated, and their relative positions, i.e. their phases, are also regulated constantly. In addition, reference numeral 10 designates a drive sprocket for the above-described finger-associated roller chain 4, and reference numeral 11 designates a gear box for driving the drive sprocket 10 synchronously with the seaming turret 7.

Now, the operation of the apparatus when the can bodies 1 are delivered from the can feed conveyor 3 to the seaming turret 7 will be explained with reference to FIG. 15. The rail 5 of the can feed conveyor 3 has an oblique terminal edge extending along a large circular arc, and a can lifter 12, which is a component of the seaming turret 7, is moved into the space at the terminal end of the rail 5. The upper surface of the can lifter 12 is flush with the upper surface of the rail 5 on the underside of the conveyor 3 and the can lifter 12 itself rotating at a high speed in the counterclockwise direction shown by arrow C. The can body 1 would travel straightly as guided along its side and bottom while being pushed by the finger 4a of the drive chain 4 of the conveyor 3, and while it is being transferred onto the incoming can lifter 12 of the seaming turret 7, it is received in the cylindrical space formed by the recess 7a of the seaming turret 7 and the recess 8a of the opposed turret 8 and is thereby centered with respect to a seaming heat (not shown).

While a can body 1 filled with liquid is pushed by the finger 4a of the drive chain 4 of the can feed conveyor 3 and enters into the recess 7a of the seaming turret 7, and when the can body 1 is about to be transferred from the rail 5 on the underside of the conveyor 3 onto the can lifter 12 rotating at a high speed in the counterclockwise direction, as shown by a white bold arrow D in FIG. 15, a frictional force caused by rotation in the counterclockwise direction is abruptly applied to the bottom of the can. Hence, the can is momentarily accelerated in the traveling direction and advances as leaving the finger 4a of the drive chain 4 (shown by the advanced state of a can body 1' depicted by a double-dot chain line).

Since the timing by which the can body 1 is received in the recesses of the turrets 7 and 8 has been set so as to conform to the case where the can body 1 is being pushed by the finger 4a of the drive chain 4, in the event that the can body 1 has been advanced after leaving the finger 4a, the can body 1 would strike against corners 7b and 8b of the seaming turret 7 and the opposed turret 8. Therefore, there is a possibility that the can body 1 will become unsteady resulting in the spilling of the liquid or scratches and depressions being formed in the can body 1. In particular, when changing the apparatus to cope with can bodies having a smaller diameter than those previously seamed, or in the case where the roundness of the can bodies is not sufficient and the width between the opposite rails of guide 6 is somewhat increased, there was a shortcoming in that the can body 1 would enter deeply into the space between the corners 7b and 8b and when the corners 7b and 8b confronted each other, the can body 1 was bitten therebetween and the can body would be depressed so much as to be damaged.

On the other hand, in case where can having different sizes are to be seamed, the replacement of parts such as the turret and the like, as well as an adjustment of the remaining parts are necessary. Of these requirements, only a phase adjustment of the can feed conveyor will be explained. FIG. 16 is a plan view of a portion of the apparatus at the time when the center of the recess 7a of the seaming turret 7, the center of the recess 8a of the opposed turret 8 and the center of the can body 1 coincide with the straight line F—F. If the can size is changed, e.g. if the apparatus set up to handle can body 1 is changed to handle the can body 1A and centering is effected, then a gap having a width f is produced between the outer circumference of the can body 1A and the finger 4a. Accordingly, in order to make the center of the new can body 1A coincide with the straight line F—F, it is necessary to displace the finger 4a by a distance f in the direction of arrow A.

The above-mentioned adjustment carried out in the prior art will not be explained with reference to FIG. 17. As shown in FIG. 17, the drive sprocket 10 is coupled to a drive flange 51 by means of a bolt 54 and a washer 55. The drive flange 51 is fixed to a drive shaft 52 rotating synchronously with the seaming turret 7. In addition, reference numerals 56 and 57 designate a latch bolt for the drive flange 51 and a washer. To effect the adjustment, the drive sprocket 10 is rotated relative to the drive flange 51 to displace the conveyor chain 9 by a distance f along a pitch line.

Referring again to FIG. 14, after the sprocket 10 has been released from the flange 51 by loosening the bolt 54, a dummy gauge having the same diameter as the can body 1A and made of a hard material is centered on the straight line F—F, the drive sprocket 10 is rotated so that the finger 4a of the drive chain 4 butts against the dummy gauge, and the bolt 54 is fastened to again fix the drive sprocket 10 to the drive flange 51. A bolt hole 10a in the drive sprocket 10 is elongate so that the drive sprocket can be rotated within a suitable range. Although the fact that cans can be conveyed smoothly is confirmed by subsequently manually moving the can seamer, it is generally necessary to perform fine adjustments by repeating the above-mentioned operation several times.

As described above, a phase adjustment of a conveyor sprocket in the heretofore known apparatus requires a delicate adjustment of a drive sprocket and the like each time the apparatus is changed, to handle cans of a different size and consequently alot of labor and time were spent in carrying out the phase adjustment of the sprocket.

Next, one example of a known arrangement of the respective units of a seaming line, in which a can lid feeder is disposed in the middle of a can conveyor interposed between a can filler and a can seamer, will be explained with reference to FIG. 18. Such an arrangement is disclosed in Japanese Patent Application No. 3-131680 (1991). A can body 1 filled with liquid by a can filler (not shown) is conveyed by a can feed conveyor 3 in the direction of the arrow. As described previously, this can feed conveyor 3 consists of a finger-associated chain 4 having a function of pushing and conveying can bodies at a constant pitch along guides and beneath and extending along the side of the can bodies. In addition, reference numeral 106 designates a can lid feed mechanism, in which can lids 107 are fed one-by-one onto can lid guide plates 109 and 109a by a separate (not shown) at a timing matched with the traveling can bodies 1. The can lids are then placed on top of the traveling can bodies 1 by means of a can lid feed claw 105b mounted to the tip of a tooth of a can lid feed turret 105. The can lids 107 thereafter drop from terminal end portions of the can lid guide plates 109 and 109a and are fitted to the can bodies 1 so as to cover the latter.

Now, the relative position between each can body 1 and the can lid 107 during the above-mentioned process will be described. In the can lid feed section, a traveling speed of a can body 1 moving on the can conveyor 3, and a circumferential speed of the pitch circle, i.e. a circle passing through the centers of circles coincident with the semicircular recesses of the can pockets 105a of the can lid feed turret 105, are set to be equal. Also, the same turret 105 and the can conveyor 3 are operated in phase with each other so that when a can body 1 traveling on the can conveyor 3 approaches the same turret 105, the can body 1 will enter a can pocket 105a of the same turret 105.

The teeth of the turret 105 are machined along cycloids, and hence the traveling can bodies 1 enter and leave the can pockets 105a of the same turret 105 without interfering with the teeth of the turret 105. When a can body 1 has entered a can pocket 105a of the same turret 105, as described above, the can lid 107 drops from the can lid guides 109 and 109a and is fitted to the can body 1 so as to cover the latter. It is to be noted that in FIG. 18, arrows E indicate the position where each can lid 107 is fitted to a can body 1 so as to cover it.

Next, an example of another heretofore known apparatus, in which a centering device is used at an inlet of a turret, will be described with reference to FIG. 19. Such an apparatus is disclosed in Japanese Utility Model Application No. 63-45564 (1988). In FIG. 19, reference numeral 101 designates a filler, numeral 119 designates a seamer, and numeral 112 designates an inlet guide. It is to be noted that FIG. 19 shows an example in which two can drum guide turrets 104, 104 are juxtaposed and switchable, and in which a can lid feeder 110 is disposed in line with the can conveyor 3 midway between the filler 101 and the seamer 119.

Now, the can drum guide turret 104 will be described in detail with reference to FIG. 21. Tip ends of teeth defining a can pocket 104a extend radially outward of a pitch circle, and the periphery of each portion 104b so extending has the shape of a cycloid. More specifically with reference to FIGS. 21 to 24, FIG. 21 shows a state in which a can body 1 is conveyed in the direction of arrow F by means of a chain having fingers 115 and is delivered into a can pocket 104a of the turret 104 rotating in the direction of arrow L as synchronized with the same chain. FIGS. 22, 23 and 24 respectively show cans 1a, 1b and 1c being sequentially conveyed.

At first, with reference to FIG. 21, a locus of the center of a can body 1 when the can is moved into a can pocket 104a is a cycloid G depicted by a dashed line. Hence, the portion of the tooth which would otherwise interfere with the can body 1 is omitted and the periphery thereof has the shape of a curve H depicted by a dashed line, whereby the periphery of the tip end of the tooth has the shape of a cycloid. It is to be noted that while the tip could be sharp, this tip can be cut into an appropriate length and can be rounded as shown in FIG. 20.

As the can body 1 is conveyed rightwards by the chain associated with the fingers 115, and once it has come to the position denoted by 1b in FIGS. 21 and 22, the can body 1 is held in position while in contact with the guides 112, 114, the can drum guide turret 104 and the finger 115 at points R and P on the front and rear of the can body and at points Q and S on the left and right sides of the can body. Under this restrained condition, the can body moves to the state shown in FIG. 23 and then, as shown at 1b in FIG. 24, the can is fed into the can pocket 104a of the can drum guide turret 104 under a stabilized condition.

In the heretofore known apparatus described above and illustrated in FIGS. 21 to 25, when the can bodies 1 are fed into the can pockets 104a of the turret 104 as conveyed by the chain, since the can bodies 1 are conveyed while in contact with the peripheral surfaces of the teeth of the turret 104 and the guides 112 and 114 before entering the can pockets 104a, even if the can bodies are filled with liquid, the liquid is prevented from spilling.

However, in the above-described apparatus in the prior art, the means for conveying can bodies 1 includes the fingers of a conveyor chain which push the can bodies 1 as guided by a rail beneath the can bodies and by guides on the both sides of the can bodies. In these cases, the rotational speed and phase of the can pockets 104a of the can drum guide turret 104 are matched with the speed and phase of the can bodies 1 pushed by the fingers 115. Hence, although the can bodies correctly enter the can pockets 104a of the can drum guide turret 104, if the pitch of the can bodies should vary due to an error with the chain, then the timing would deviate. Namely, as shown in FIG. 25, the fingers 115 could be located at positions shown by the fingers 115' depicted by double-dot chain lines. Hence, the can bodies 1b would also be positioned as depicted by double-dot chain lines, thus striking a tooth (T) of the can drum guide turret 104. In this case, the can body would be pushed in the direction of the white bold arrow, and would be depressed and damaged as pinched between the tooth (T) and the can guide 112 at position (S). Also, when there is a difference between the height of the can drum guide turret 104 and the height of the can guide, there is a problem in that a torque is applied to the can body due to the pushing force upon pinching the can body, resulting in a tilting or unsteady movement, whereby the liquid could spill out. Despite these problems, however, an error in the uniformity of the pitch of the chain and of that in the pitch of the can being conveyed by the fingers caused by the error must be tolerated to a certain extent.

SUMMARY OF THE INVENTION

It is therefore one object of the present invention to provide a can feeding apparatus for a can seamer, in which feeds can bodies in such a manner that when a can body enters a seaming turret and an opposed turret the can body will not strike against the teeth of the turrets which would otherwise result in the spilling of liquid nor would the can body be bitten between the teeth of the respective turrets which could otherwise result in a depression being formed in the can body.

Another object of the present invention is to provide a can feeding apparatus for a can seamer which can prevent the above-described spilling of liquid and biting of a can body with a simple structure, and which can even handle can bodies of different diameters and of different degrees of roundness.

Still another object of the present invention is to provide a can feeding apparatus for a can seamer, in which, in addition to the above-mentioned improvements, can adjust the phase of a conveyor sprocket easily in a short period of time so as to facilitate the seaming of can bodies of various sizes.

Yet another object of the present invention is to provide a can lid feeding apparatus in which can bodies will not be damaged or become so unsteady as to cause the spilling of liquid when the can bodies enter a can drum guide turret.

In order to resolve the problems occurring when a can enters a seaming turret as described above, according to the present invention, in a can seamer having a seaming turret, a plate rail, guides on both sides of the rail, and a conveyor including fingers of a drive chain, which convey the can bodies on the rail to the seaming turret the seaming turret and/or an opposed turret facing the seaming turret are provided with claws extending radially outwardly of the pitch circle of the turret and a profile of a surface of the claw is of cycloids preventing the can bodies from being pierced.

Due to the claws, at the position where a can body is delivered to a can lifter, the interval between the teeth of the seaming turret and the opposed turret is small and the distance that a can drum can advance relative to a finger of the conveyor chain is small. Unsteady motion of the can body as well as an impact applied to the can body when the can body strikes against a tooth of the turret are accordingly small, and the can body would never enter deeply into the space between the teeth of the turrets and be bitten by the teeth.

Also, according to another aspect of the present invention, in the case of handling cans made of a magnetic material, the can feeding apparatus includes a plate-shaped magnet mounted to a side surface can guide adjacent the can seamer at a position where a can body conveyed by the can feed conveyor is delivered to a can lifter of the can seamer. The magnet is flush with the guide surface of the can guide.

Thus, even if an accelerating force in the traveling direction were to act on the bottom of a can body made of magnetic material when the can body passes from a rail to a can lifter, the can body will not depart from the finger of the drive chain because a braking force is applied to the can body by the magnet mounted to the can guide.

In addition, according to still another aspect of the present invention, a brush is mounted to a can guide adjacent the drive chain so as to push the traveling can body horizontally at right angles to the traveling direction.

A braking force generated by this brush acts upon the can body so that, again, the can body will not depart from the finger of the drive chain.

In addition, if both the magnet and the brush are employed, then the can body would be pressed by the brush toward the magnet to insure that the magnet acts on the brush itself and would exert a braking force on the can body.

According to yet another feature of the present invention in addition to the above-mentioned improvements, the phase of a conveyor sprocket of the can feed conveyor can be adjusted easily in a short period of time by a phase adjusting device. The sprocket and a drive flange for driving the sprocket are mounted so as to be relatively positionable. The phase adjusting device includes an eccentric bolt threaded to the drive flange and capable of moving in the circumferential direction of the flange, and a phase adjusting plate detachably fixed via a pin to the drive sprocket. A correct relative position of the conveyor for a given size of a can body can be obtained by merely rotating the eccentric bolt when an end surface of the phase adjusting plate butts the eccentric bolt.

To set the correct phase of the conveyor, a phase adjusting plate corresponding to the size of the can body is mounted to the drive sprocket and the drive sprocket and the drive flange are fixed by bolts while the end surface of the phase adjusting plate is made to butt against the eccentric bolt. If necessary, a fine adjustment is effected by means of the eccentric bolt, but this fine adjustment is unnecessary in the next and subsequent adjustments. It is to be noted that by providing two eccentric bolts, the conveyor can handle two can sizes by making use of both end surfaces of one phase adjusting plate.

Furthermore, in addition to solving the above-mentioned problems involved in a can seamer, the present invention resolves problems in a can drum centering device in a can lid feed section of a production line. In the can lid feed section are disposed a can lid feed turret adjacent a can lid feed mechanism and provided with a large number of can pockets at a circumferential pitch equal to or somewhat larger than a feed pitch of the fingers of the conveyor. The can lid feed turret is synchronized with the fingers. A turret opposed to the can lid feed turret, with the can conveyor interposed therebetween, rotates in the opposite direction to the direction of rotation of the can lid feed turret but at the same circumferential speed. Thus opposed turret has can pockets into which a can body enters at the same time as the can body enters a pocket of the can lid feed turret. Portions of the turrets contiguous to respective surfaces thereof in the shape of circular arcs defining the can pockets extend radially outwardly of a pitch circle of the turret and have profiles of cycloids.

Accordingly, at an inlet of the can lid feed mechanism, a can body is restrained as soon as it is delivered from a finger of the can conveyor to the can feed turret and opposed turret both having teeth having cycloidal profiles. The can body is correctly centered on a straight line connecting the centers of the respective turrets, that is, at the position where a can lid fed by the can lid feed mechanism engages and covers the can body. A can having a lid fitted thereon continues to travel, and when it leaves the teeth of the turrets, is advanced towards a seamer by means of a finger of the conveyor.

The above-mentioned and other objects, features and advantages of the present invention will become more apparatus by referring to the following description of preferred embodiments of the invention taken in conjunction with the accompanying drawings.

DESCRIPTION OF THE PREFERRED EMBODIMENTS

Figure 1:
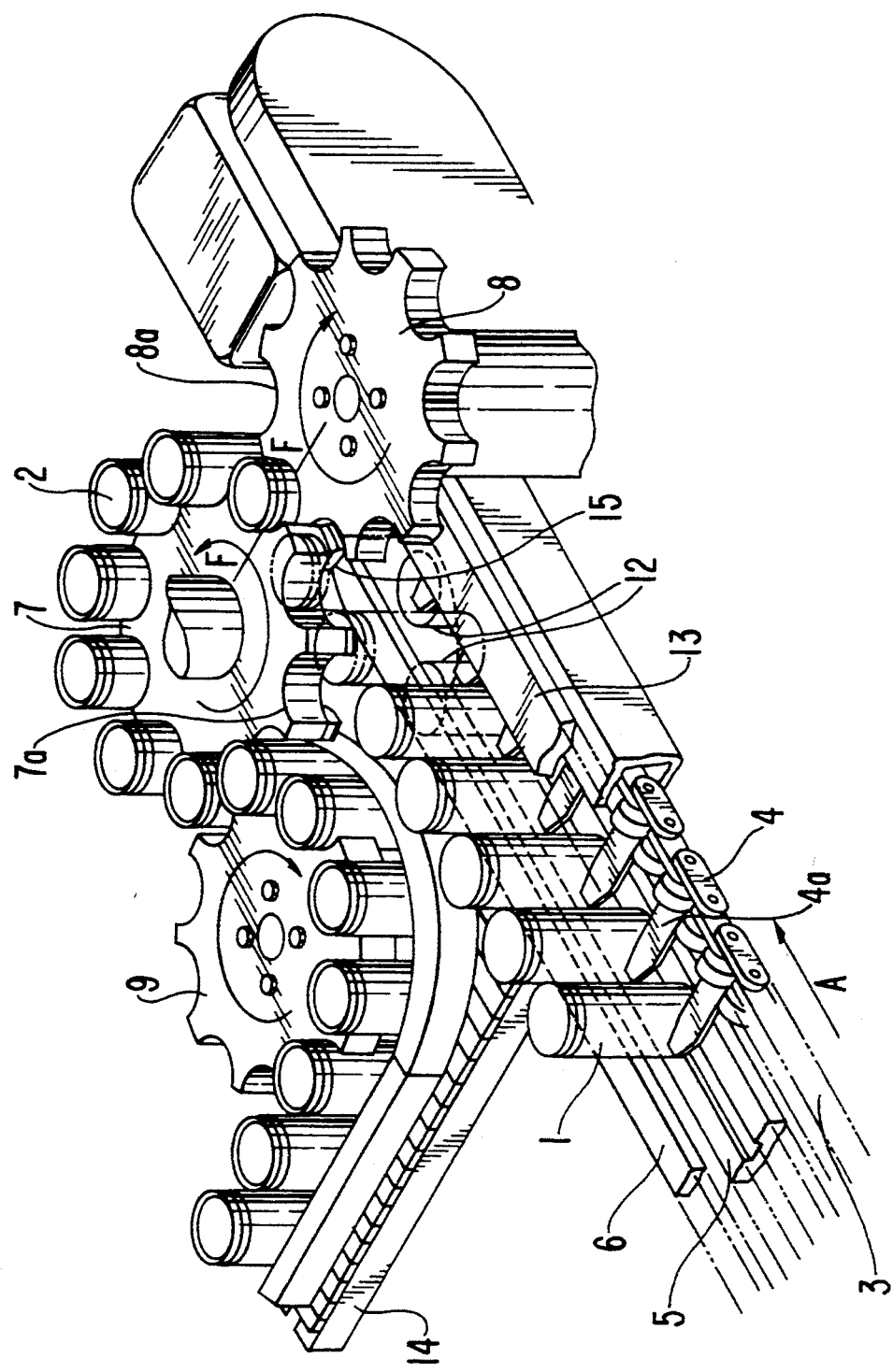
FIG. 1 is a perspective view of a can seaming line, to which the present invention is applicable.

In FIG. 1, a can body 1 filled in a filling machine (not shown) is pushed by a finger 4a, mounted to a drive chain 4 of a can feed conveyor 3, on a rail 5. The can body 1 is then transferred onto a can lifter 12 of a can seamer moving in synchronism with the conveyor 3 as guided on its opposite sides by a guide 6 and a chain side guide 13, and enters a recess 7a of a seaming turret 7. At this moment, a recess 8a of an opposed turret 8 is disposed symmetrically to a recess 7a of a seaming turret 7, the turret 8 rotating in a direction opposite to but synchronized with the turret 7. The recess 7a of the seaming turret 7 and the recess 8a of the turret 8 pinch the can body 1 from the opposite sides on a line F—F in FIG. 1, and center the can body 1 at a proper position for a seaming operation.

After a can lid 2 has been joined to the can body 1 by means of a seaming roll (not shown) the can is moved by an ejection turret 9 to a can ejection conveyor 14. It is to be noted that since the portion of the invention described up to this point is similar to that of the can seaming line in the prior art above, reference numerals identical to those in FIGS. 7 and 8 have been used.

Figure 2:
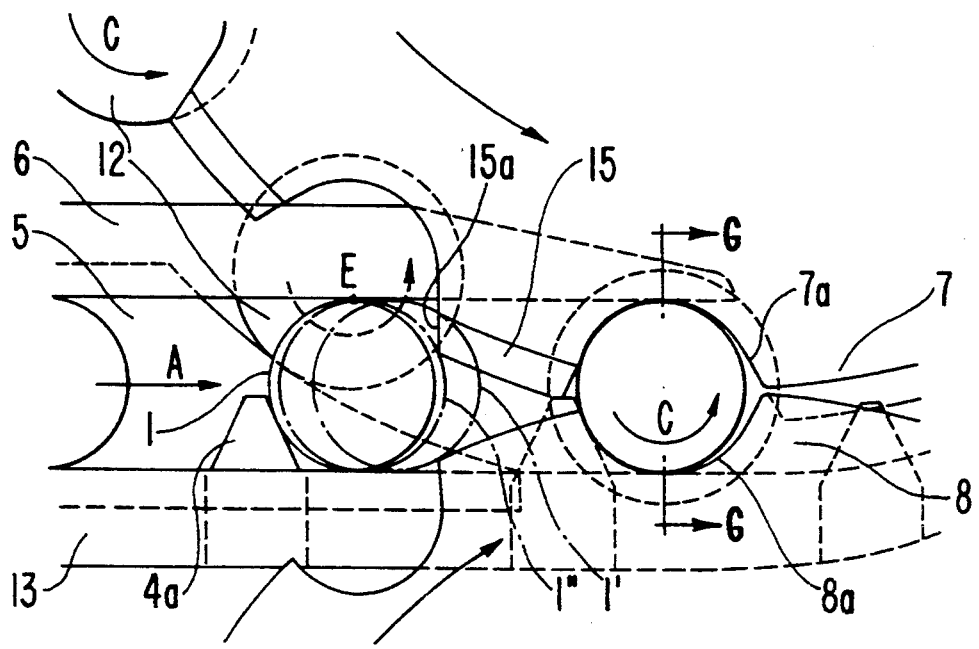
FIG. 2 is a plan view of a can delivery section of a first preferred embodiment of the present invention.

FIG. 2 is a plan view of portion of a first preferred embodiment where the can body 1 is delivered from the can feed conveyor 3 to the seaming turret 7. Referring to this figure, on the outer circumferential portion of the seaming turret 7 is provided a claw 15 having a portion 15a of a cycloidal profile which will not impede the can body from traveling so that the can body is not pierced. In other words, this claw 15 projects radially outwardly of the pitch circle, and the profile of the projecting portion 15a is formed of cycloids.

It is to be noted that although the profile is, in practice, an envelope of curves traced by the circumference of a circle, having the same radius as that of the semicircular recess of the turret, when a center of the circle has moved along cycloids intersecting the pitch circle of the turret at the centers of circles coincident with the recesses of the turret, for the sake of convenience, this envelope will be referred to merely as a "cycloid".

Figure 15:
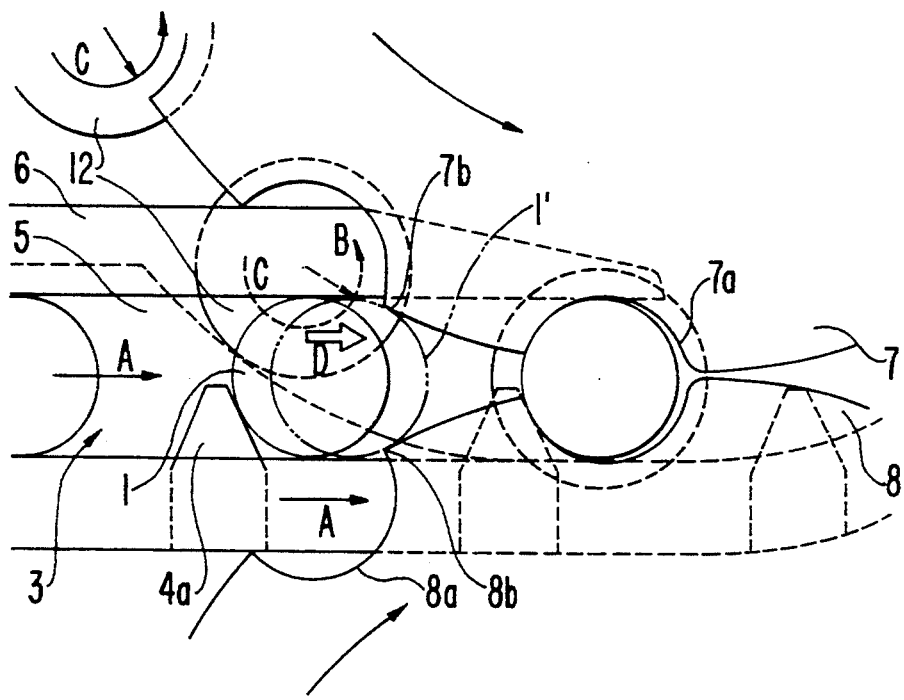
FIG. 15 is a plan view of a can delivery section of the prior art can seaming line.
Figure 14:
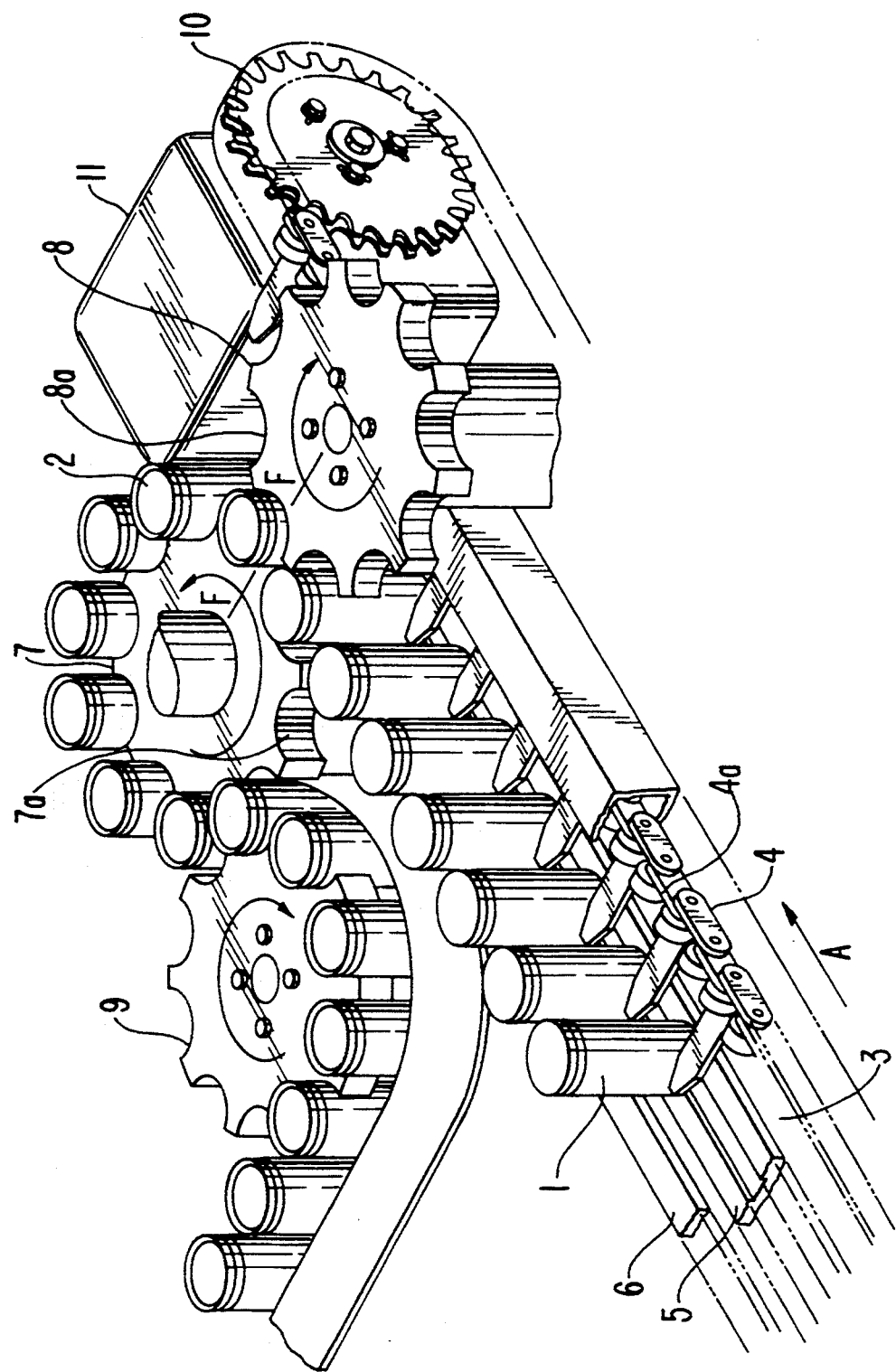
FIG. 14 is a perspective view of a can seaming line employed in the heretofore known canned food production line.

Although the claw 15 is depicted in the figure to have a width equal to the length of a circular arc concentric with the turret and extending between adjacent recesses, the width of the claw 15 is arbitrary. Can body 1 is at a correct position while traveling as pushed by the finger 4a; can body 1' (double-dot chain line) is at a position which can result in the prior art when the can body is advanced after having left the finger 4a and has struck against the corner 7b (FIG. 15) of the seaming turret 7; and can body 1" (single-dot chain line) is at a position which results in the present invention when the can body has struck the claw 15. It is to be noted that the same type of claws 15 could be provided on the opposed turret 8, and in this case the arrangement is symmetrical to that shown in FIG. 2.

Figure 3:
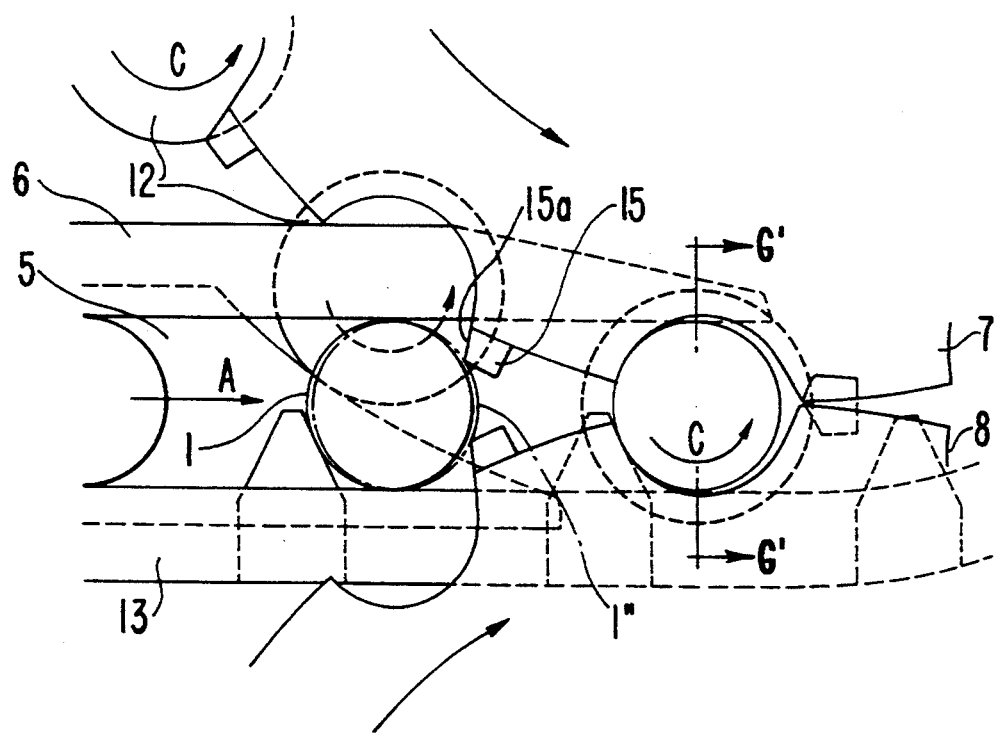
FIG. 3 is a plan view of a can delivery section of a second preferred embodiment of the present invention.

FIG. 3 shows a second preferred embodiment of the present invention, in which claws 15 (in the illustrated embodiment, their widths are small) are provided on both the corner 7b (FIG. 15) of the seaming turret and the corner 8b (FIG. 15) of the opposed turret 8, and this modified embodiment is effective in the case where the chain-side guide 13 is not present. It is to be noted that the claws 15 could be formed either as a component part and mounted to the turret or could be made unitarily with the turret.

Figure 4:
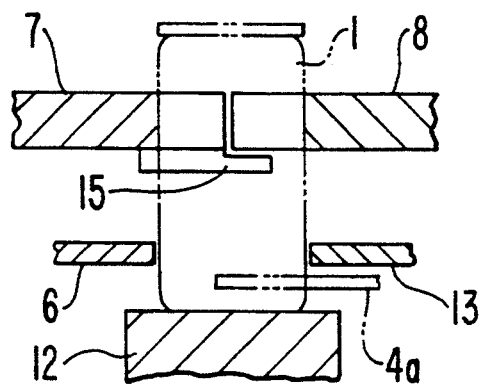
FIG. 4 is a cross-sectional view taken along line G—G in FIG. 2.
Figure 5:
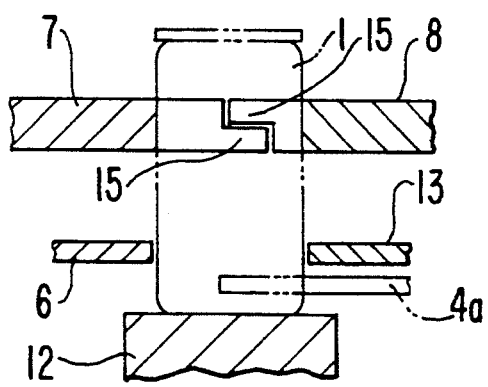
FIG. 5 is a cross-sectional view similar to FIG. 4 but showing another form of the invention.
Figure 6:
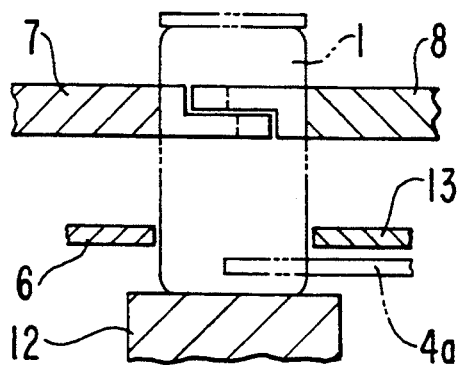
FIG. 6 is a cross-sectional view taken along line G'—G'.

FIGS. 4 to 6 are cross-sectional views showing the position of a claw 15 relative to the seaming turret 7 and the opposed turret 8. FIG. 4 shows an embodiment in which the claw 15 is mounted to the underside of the seaming turret 7; FIG. 5 shows an embodiment in which the claw 15 is part of the thickness of the seaming turret 7; and FIG. 6 shows the modified embodiment of FIG. 3 in which the claws 15 are provided on both the seaming turret 7 and the opposed turret 8. However, in every case, it is necessary to provide a space to accommodate the claws so that the claws 15 do not interfere with the counterpart turret. Incidentally, such a space is also necessary in the ejection turret.

As shown in FIGS. 2 and 3, in the case where the present invention is applied to the seaming turret 7 and the opposed turret 8, even if the can body 1 were accelerated in the traveling direction by the can lifter 12, since the distance over which the drum 1 can leave the finger 4a is limited to a short distance, an inclination of the orientation of the can body, that is, unsteady behavior of the can body 1 is inhibited. Hence, an impact of the can body against the seaming turret 7 and/or the opposed turret 8 is minimal, and the can body 1 is never bitten between the seaming turret 7 and the opposed turret 8.

As described in detail above, according to the above-described preferred embodiments of the present invention, because of the fact that the distance by which a can body the finger is short, unsteady behavior of the can body, and the spilling of liquid from the can body as well as damage of the can body caused by an impact of the can body against a corner of the turret will not occur. In addition, since the can body cannot enter deeply between the seaming turret and the opposed turret, the can body will not be bitten by the turrets, and a depression would not be produced in the can body.

Another preferred embodiments will be described with reference to FIGS. 7 and 8. It is to be noted that in FIGS. 7 and 8, similar components to those in the above-described preferred embodiments are designated by like reference numerals, and a detailed description thereof will be omitted.

Figure 7:
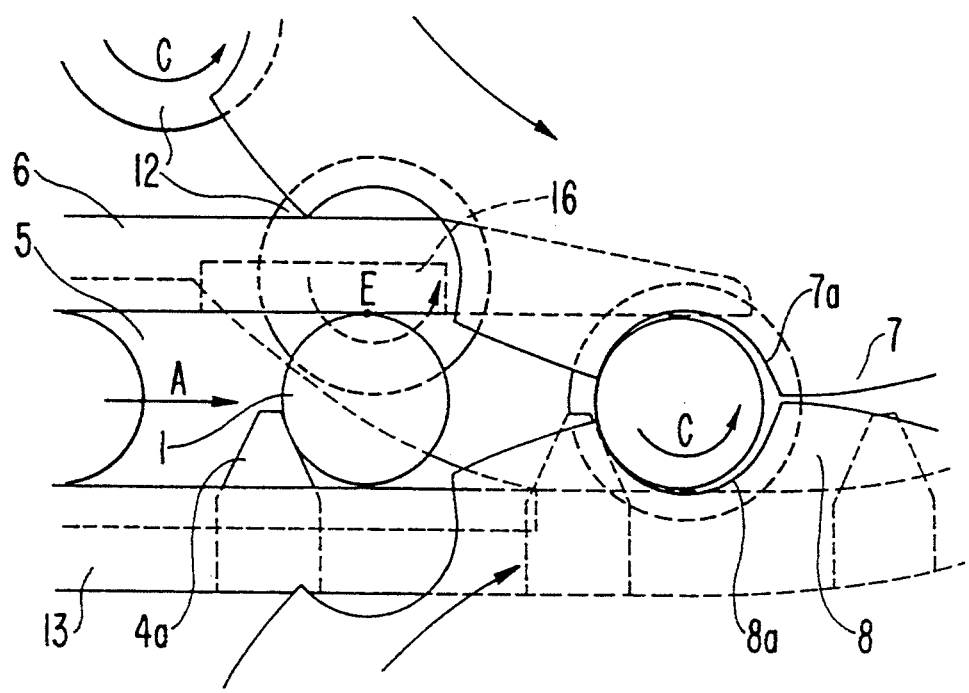
FIG. 7 is a plan view of a can delivery section of a third preferred embodiment of the present invention.

In the embodiment of FIG. 7, a plate-shaped magnet is provided at a location where a can body 1 is delivered from a can feed conveyor 3 to a seaming turret 7. In this figure, reference numeral 16 designates the magnet, which is mounted to a can guide 6 and is disposed at such a position that a magnetic force will act upon the can body 1 during the period from when the can lifter 12 enters in front of the surface of the rail 5 until half of the can body 1 is received in a recess of the turret 7. Reference character E designates a point where the can body 1 is braked, this braking force offsetting a frictional force in the traveling direction exerted upon the bottom of the can body due to rotation of the can lifter 12. Therefore, the magnet 6 serves to prevent the can body 1 from being accelerated and leaving the finger 4a, prevents liquid from spilling due to unsteady behavior of the can body 1 and prevents the can body 1 from striking against a corner of the turret and being damaged.

Figure 8:
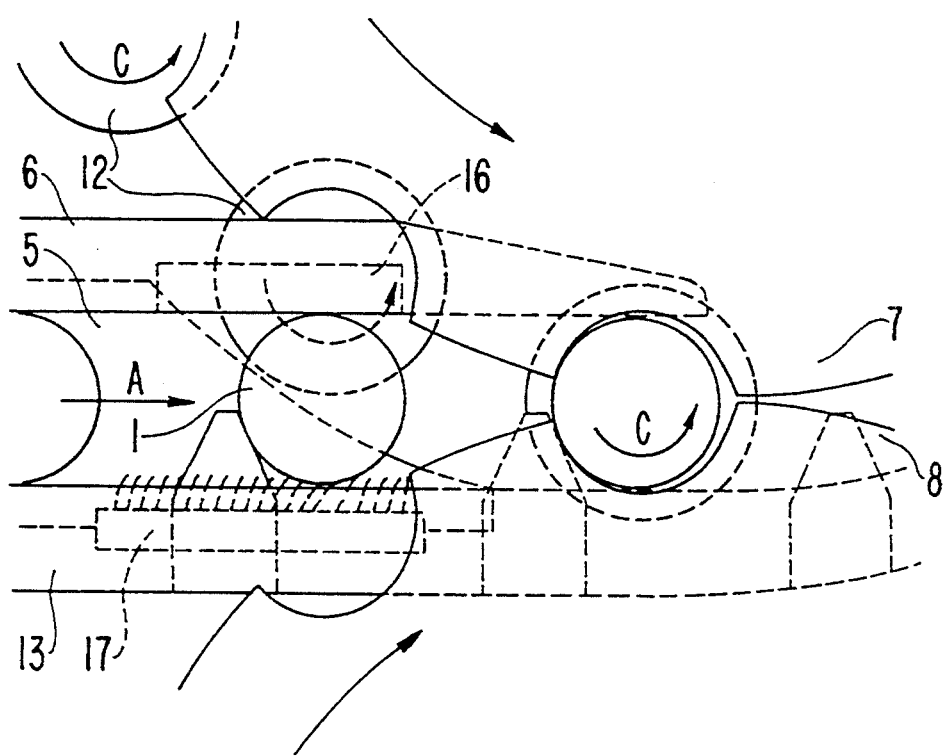
FIG. 8 is a plan view of a can delivery section of a fourth preferred embodiment of the present invention.

FIG. 8 shows a fourth preferred embodiment of the present invention in which, in addition to the magnet 16 mounted to the can guide 6 in the third preferred embodiment shown in FIG. 7, a brush 17 is mounted to the guide 13 adjacent he drive chain with the bristles of the brush facing the can. When it is necessary to handle can bodies having varying degrees of roundness, it is necessary to slightly widen the can passageway. At this time there is a possibility that a can body 1 could be left at a distance position from the magnet where the magnetic force of the magnet is not effective. However, even in such a case, the brush 17 provided on the guide 13 opposite the magnet 16 acts to push the can body so that the can body 1 is brought to the magnet 16 and a braking action is surely exerted upon the can body 1. It is to be noted that in the case where cans made of aluminum, which is non-magnetic material, are used in the arrangement shown in FIG. 8, although the magnet does not exert a braking force on such can bodies, the can body is still pushed by the brush 17, and so a braking force acts upon the can body due to this pushing force and a frictional force produced by the brush.

As described in detail above, in the can feeding apparatus a magnet is provided on the can guide adjacent the can seamer and a brush is provided on the can guide adjacent the drive chain so as to push a traveling can body horizontally at right angles to the traveling direction at the location where the can body is transferred from the underside rail of the conveyor to the can lifter of the seaming turret. Therefore, the can body is advanced while being kept in contact with the finger of the drive chain and while being kept in contact with the can guide adjacent the seamer, that is, while constrained. The timings under which the can body enters the recess of the seaming turret and the recess of the opposed turret are thus surely matched. Hence, unsteady behavior of the can is eliminated, and liquid does not spill from the can body. Also, even in the case where the can seaming line is set up to handle can bodies having a smaller diameter, the can bodies would never strike against a corner of the turret and be damaged. Furthermore, in the case where can bodies having a smaller degree of roundness are conveyed along the line, even if the guides are somewhat far apart, the can bodies are constrained the timing by which the can bodies enter a turret is maintained.

Next, a mechanism for adjusting the phase of a conveyor sprocket of a can feed conveyor easily and in a short period of time will be described with reference to FIGS. 9 to 11. It is to be noted that in these figures, similar components to those used in the heretofore known apparatus shown in FIG. 6 are designated by like reference numerals.

Figure 9:
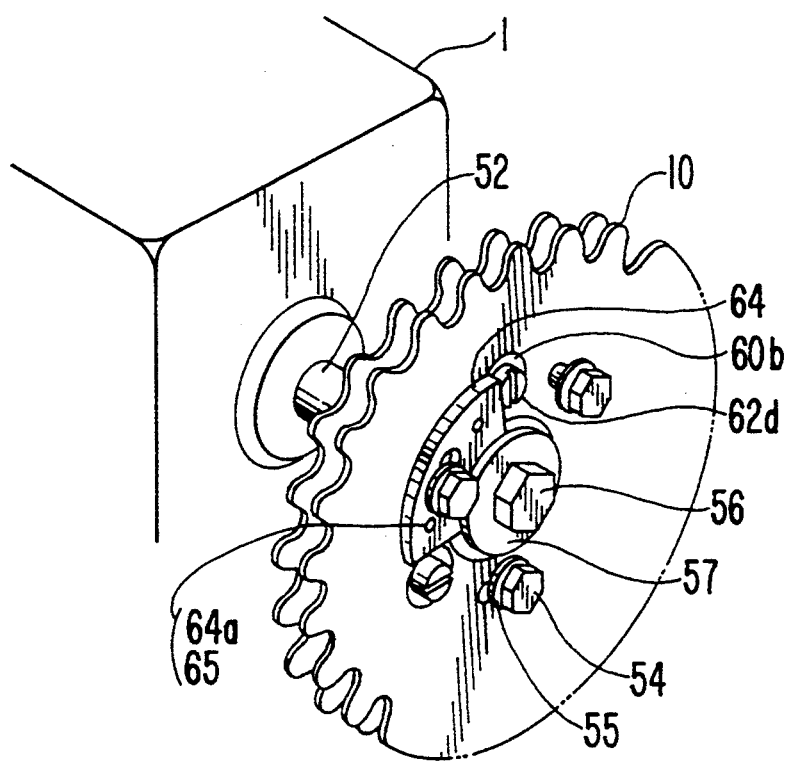
FIG. 9 is a perspective view of a drive sprocket section of the present invention.
Figure 10:
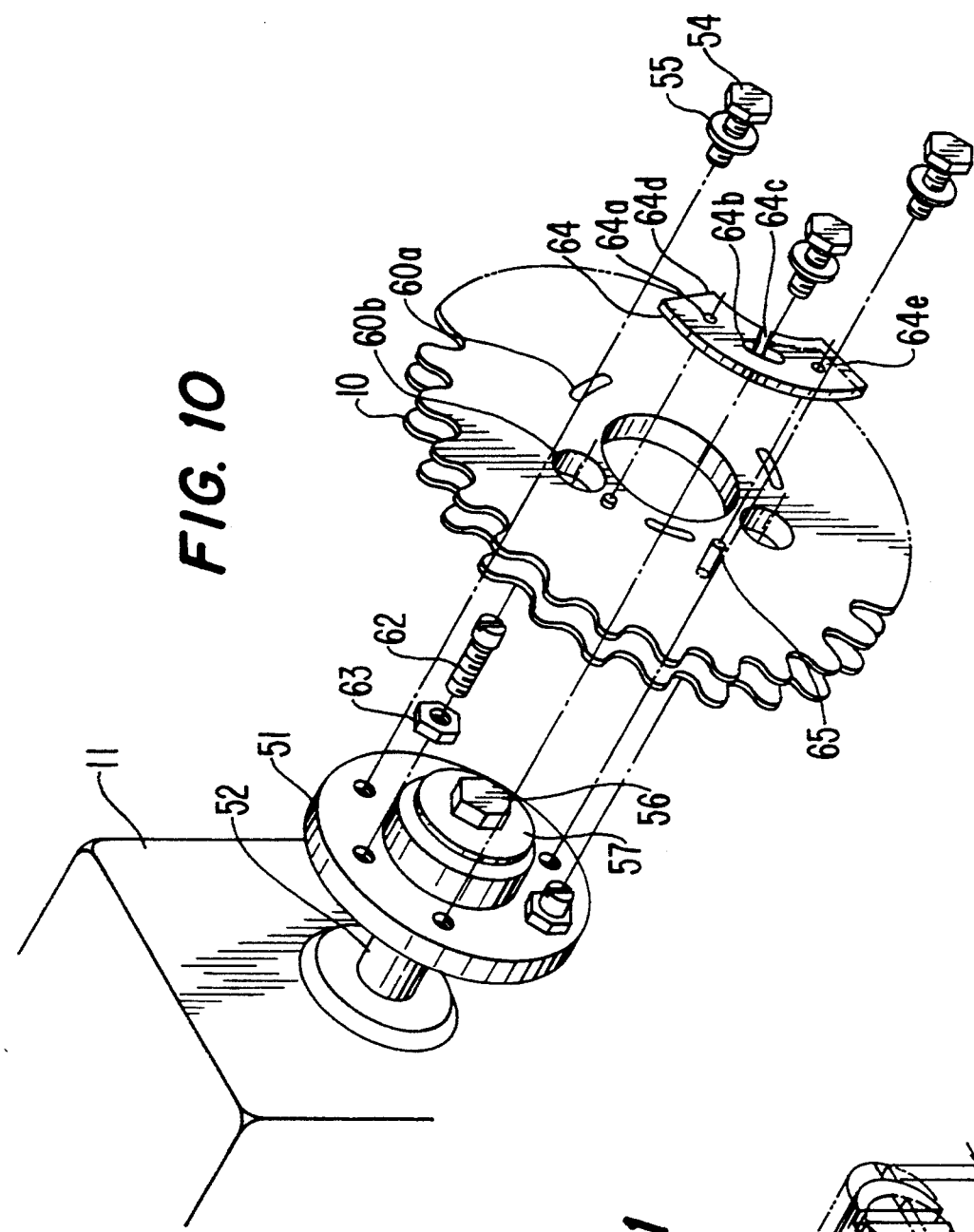
FIG. 10 is an exploded view of the drive sprocket section shown in FIG. 9.
Figure 11:
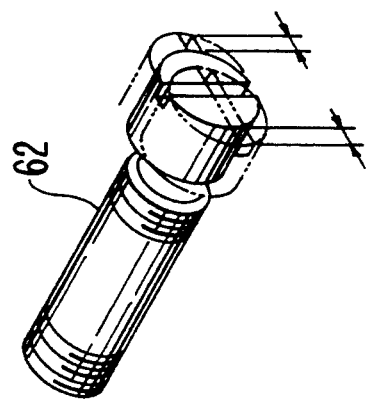
FIG. 11 is a perspective view of an eccentric bolt shown in FIG. 10.

In FIGS. 9 to 11, reference numeral 10 designates a drive sprocket for driving the finger-associated roller chain 4. This drive sprocket 10 is fixed to a drive flange 51 by means of three sets of bolts 54 extending through elongate holes 60a and washers 55. Reference numeral 60b designates holes for receiving eccentric bolts 62 and lock nuts 63, as will be described later, without the same coming into contact with the sprocket 10. The drive flange 51 is fixed to a drive shaft 52 rotating synchronously with the seaming turret 7. In addition, two sets of the eccentric bolts 62 and locknuts 63 are threaded to the drive flange 51. The eccentric bolts 62 are provided for the purpose of positioning a phase-adjusting plate 64 as will be described later. When the eccentric bolt 62 is rotated, a heat of the bolt will move along a pitch circle as shown in FIG. 11. The locknut 63, however, prevents the bolt 62 from rotating.

The phase-adjusting plate 64 has the shape of a sector of a circle and two pin holes 64a. These pin holes 64a receive pins 65 (only the lower one is depicted in the figure) fixedly secured to the drive sprocket 10. The phase-adjusting plate 64 is mounted to the drive sprocket 10 by fitting the pins 65 into the same pin holes 64a. Under this condition, the phase-adjusting plate 64 is fastened to the sprocket 10 with one of the bolts 54. The phase-adjusting plate 64 defines an elongate hole 64b of the same shape as the elongate hole 60a in the drive sprocket 10, and a slot 64c having a larger width than the diameter of the bolt. The pin 65 fixedly secured to the drive sprocket 10 projects from the surface of the drive sprocket 10 by the same length as the thickness of the phase-adjusting plate 64.

Figure 16:
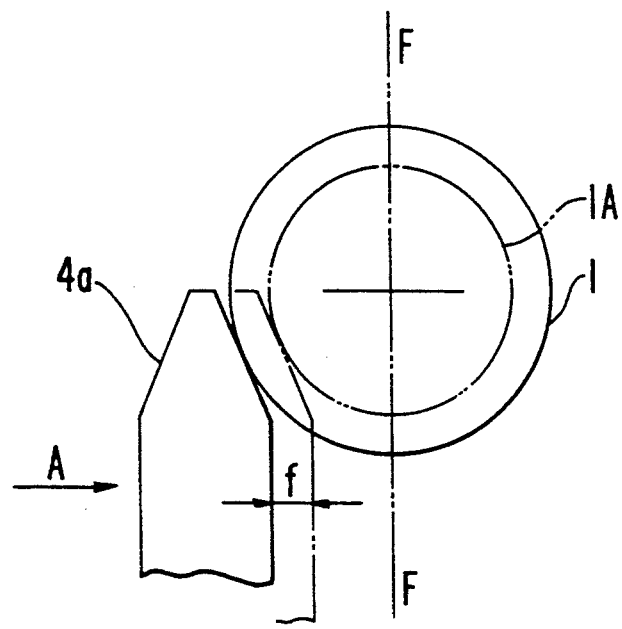
FIG. 16 is an enlarged plan view of a portion of the line shown in FIG. 14.
Figure 17:
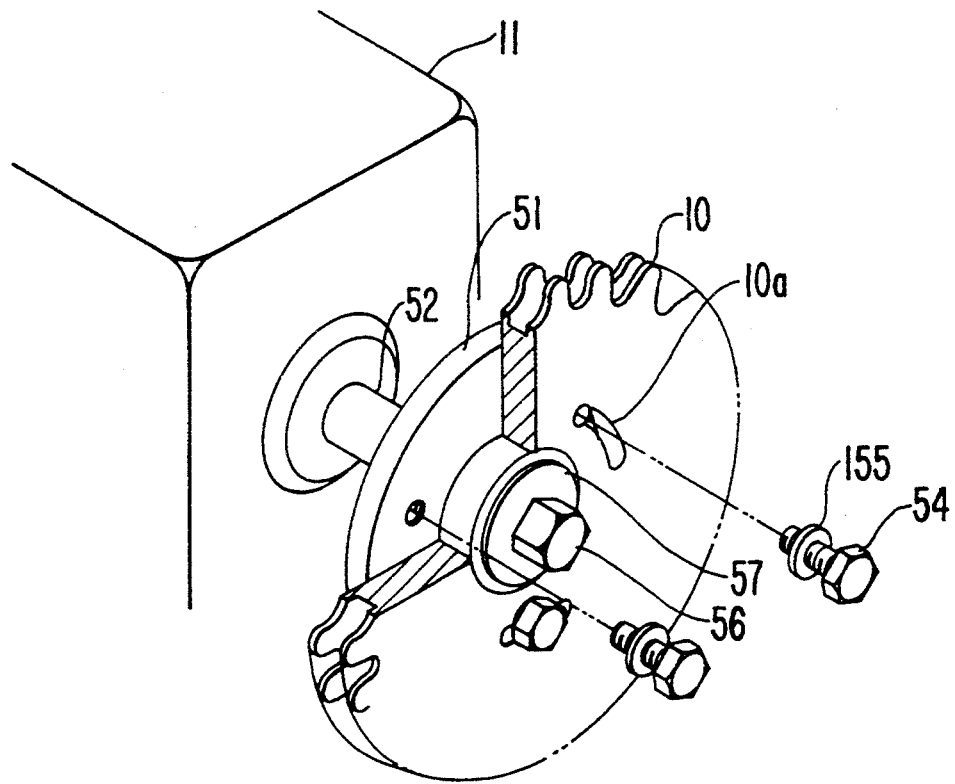
FIG. 17 is a perspective view, partly broken away, of a phase adjusting device of a drive sprocket in the prior art.
Figure 18:
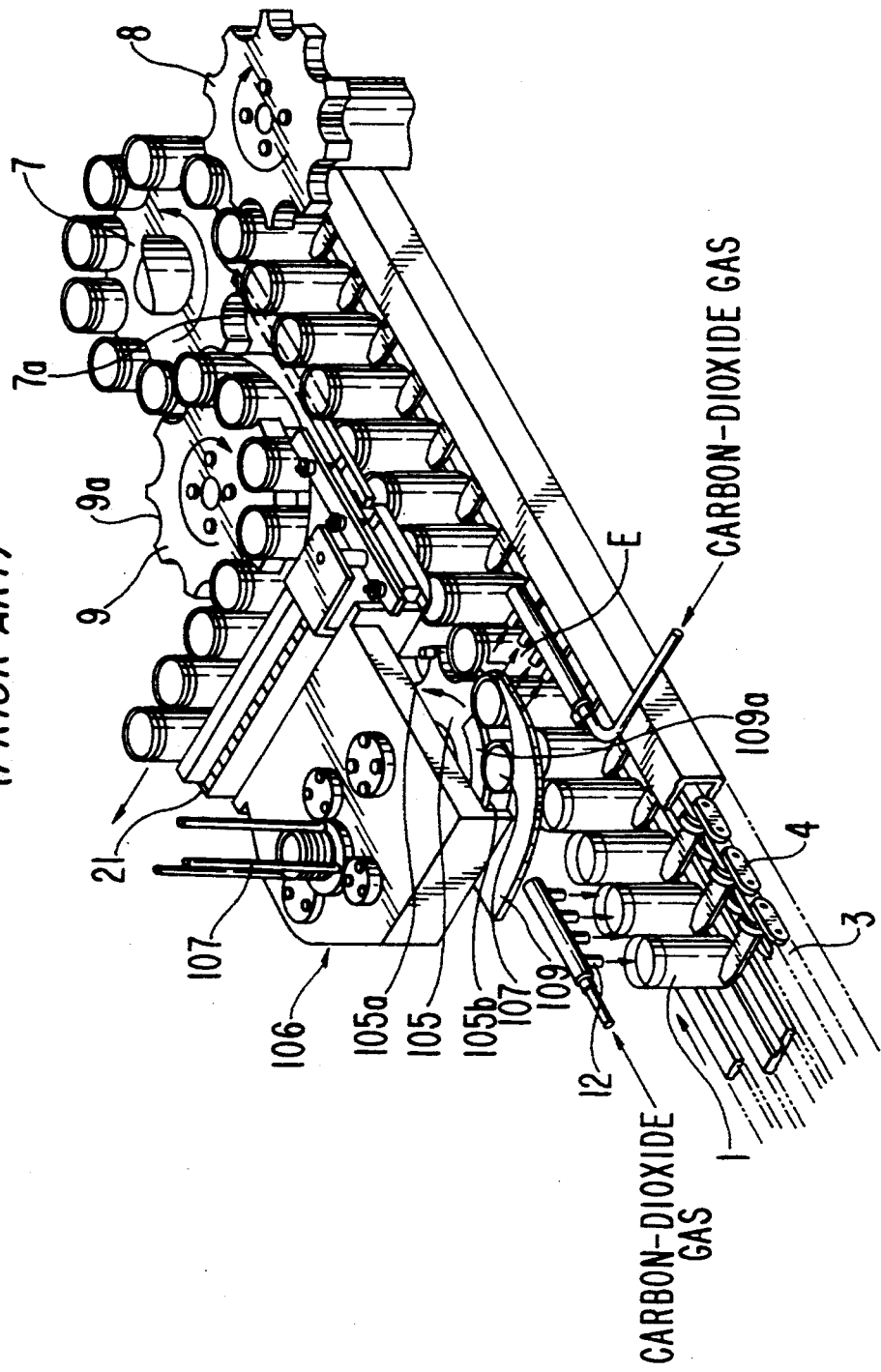
FIG. 18 is a perspective view of a can seaming line in the prior art, which includes a can lid feeder interposed between a can filler and a can seamer.
Figure 19:
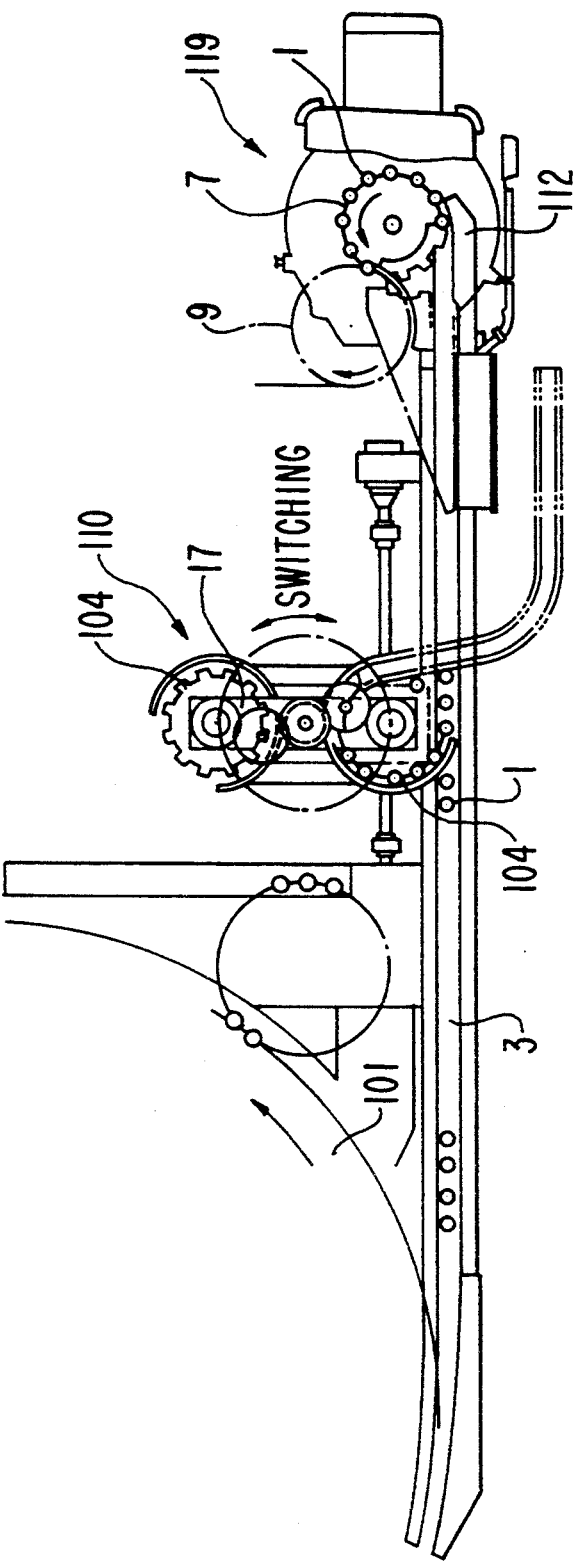
FIG. 19 is a plan view of another can seaming line in the prior art, which includes a centering device for the traveling can bodies.
Figure 20:
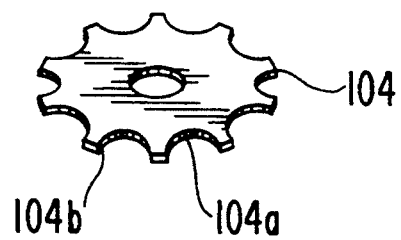
FIG. 20 is an enlarged perspective view of a can drum guide turret of the line shown in FIG. 19.
Figure 21:
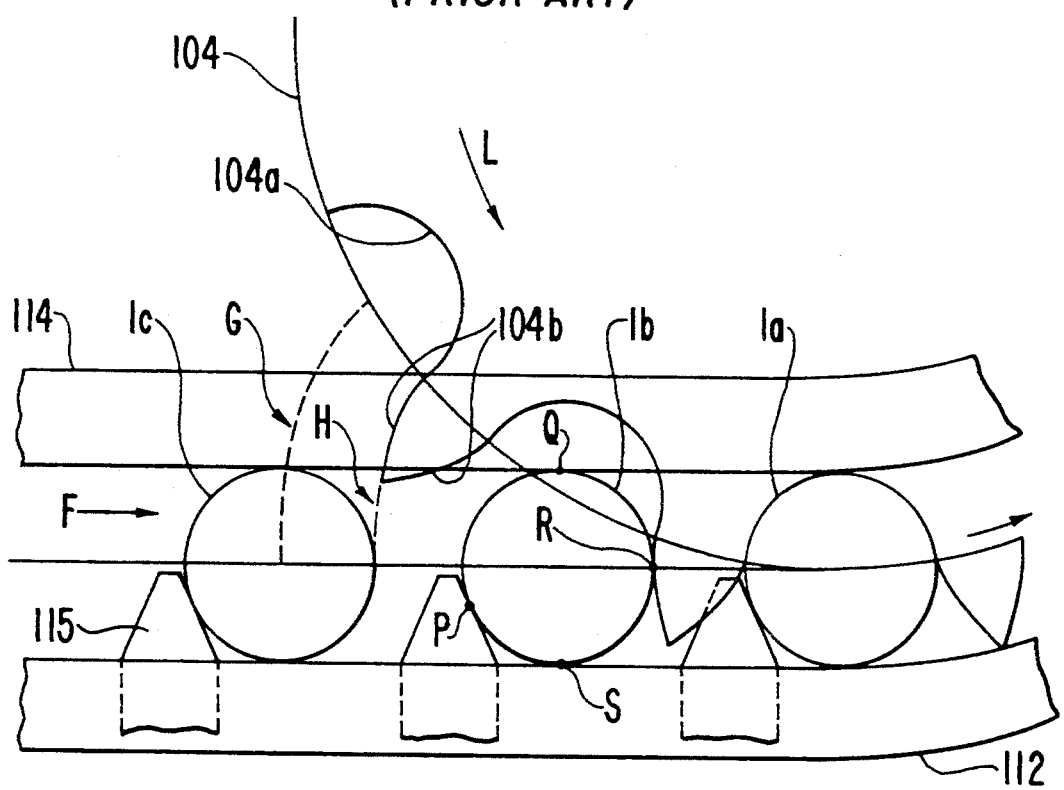
FIG. 21 is a plan view of a can drum delivery section interposed between a can drum conveyor and a can drum guide turret in the prior art.
Figure 22:
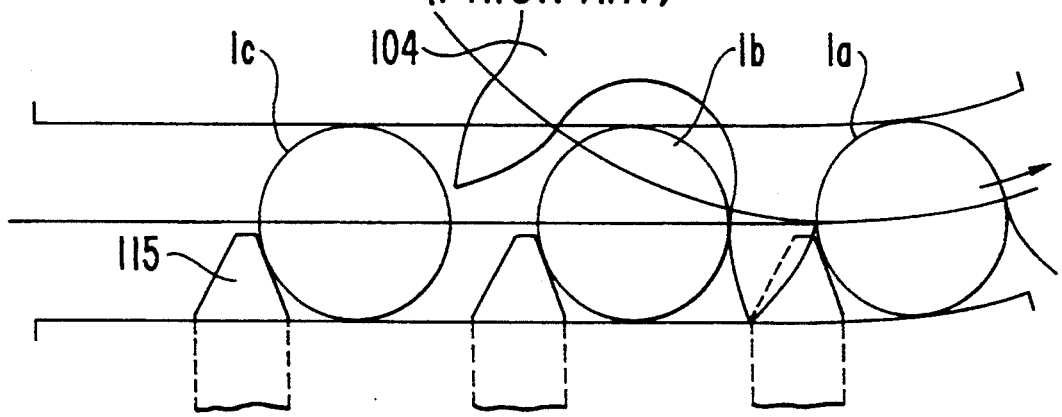
FIGS. 22 to 24 are plan views of the can drum delivery section in the prior art showing the successive steps by which a can body is delivered from a can drum conveyor to a can drum guide turret.
Figure 23:
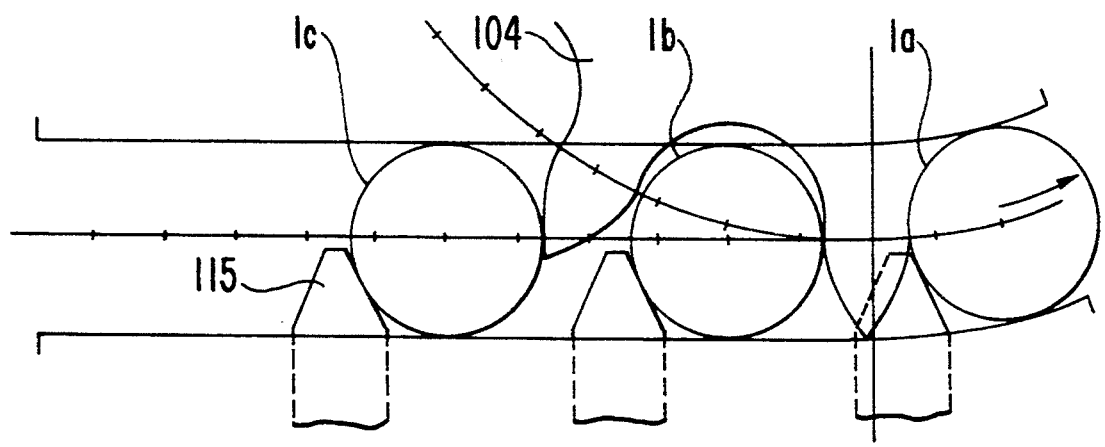
Figure 24:
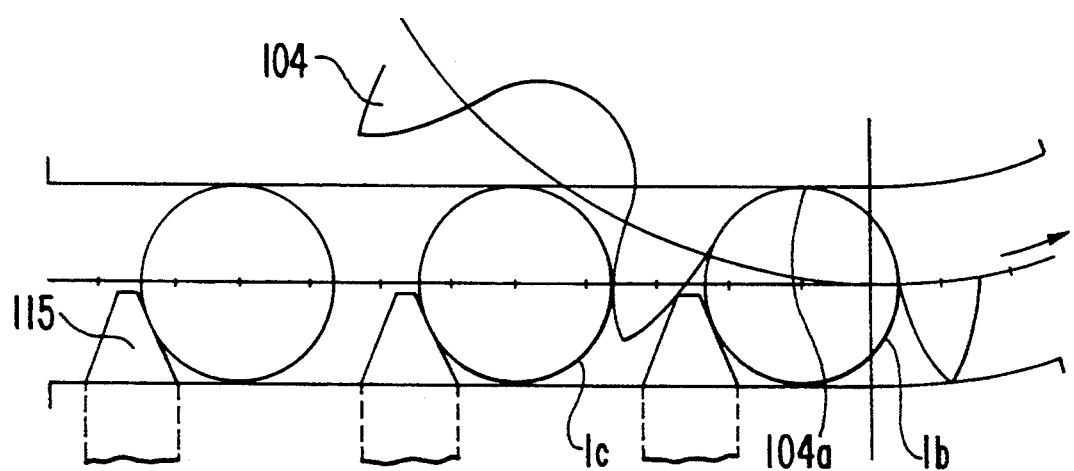
Figure 25:
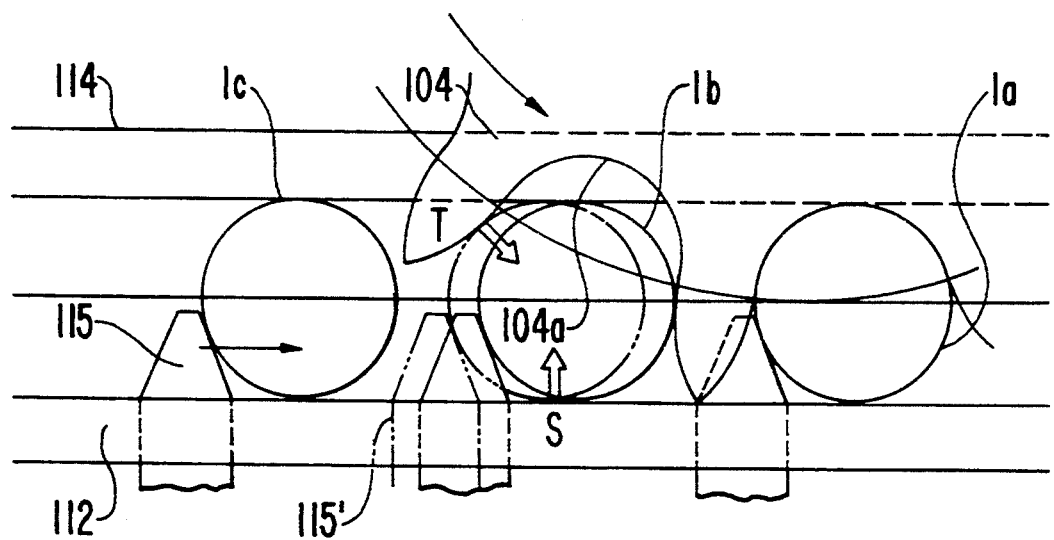
FIG. 25 is a schematic plan view of the same can body delivery section in the prior art, showing a shortcoming of the arrangement in which the pitch of fingers of the conveyor chain is not uniform due to an error in the conveyor chain.

Accordingly, by loosening the bolt 54 to the extent of the length of the pin 65 which projects from the drive sprocket and thereafter disengaging the phase-adjusting plate 64 from the pins 65, the phase-adjusting plate 64 can be dismounted from the drive sprocket. The phase-adjusting plate 64 can be replaced as necessary. It is to be noted that the shape and size of the phase-adjusting plate 64 are determined in such a manner that when one end surface 64d thereof butts against the eccentric bolt 62 fixed to the drive flange 51, the can body 1A in FIG. 16 (the smaller can body) will be centered on the straight line F—F (see FIG. 1 and FIG. 16), and when the other end 64e thereof butts against the other eccentric bolt 62, the can body 1 in FIG. 16 (the larger can body) will be centered on the straight line F—F (see FIG. 1 and FIG. 16). Accordingly, a single phase-adjusting plate is used to adjust the conveyor chain to handle two different (larger and smaller) sizes of can bodies. In the event that three or more sizes are to be handled, a respective phase-adjusting plate is employed for each two different sizes.

Next, the phase adjustment will be described in more detail with reference to FIG. 9. After the three bolts 54 were loosened and a phase-adjusting plate 64 corresponding to a can size to be handled has been mounted to the drive sprocket 10, the phase-adjusting plate 64 is made to butt against the opposing eccentric bolt 62 by rotating the drive sprocket 10, and then the three bolts 54 are turned to fasten the sprocket to the driving flange. Subsequently, a can body or a dummy gauge is placed in the recesses between the seaming turret 7 and the opposed turret 8 and the apparatus is moved manually. It is thus confirmed as to whether can bodies will be conveyed smoothly, and if necessary, the above-mentioned procedure is repeated while finely adjusting the eccentric bolt 62 abutting the phase-adjusting plate 64. It is to be noted that the fine adjustment by means of this eccentric bolt 62 will become unnecessary next time a phase adjustment is carried out. Although the end surface 64d of the phase-adjusting plate 64 is made to butt against the eccentric bolt 62 in the arrangement shown in FIG. 9, if the opposite surface 64e of the phase-adjusting plate 64 is made to butt against the other eccentric bolt 62 by rotating the drive sprocket 10 in the opposite direction, then the apparatus is adapted to handle another (larger) can body. As described above, by merely carrying positioning the phase-adjusting plate relative to the eccentric bolt, the phase of the conveyor can be adjusted simply.

Next, another preferred embodiment of the present invention will be described with reference to FIGS. 12 and 13.

Figure 12:
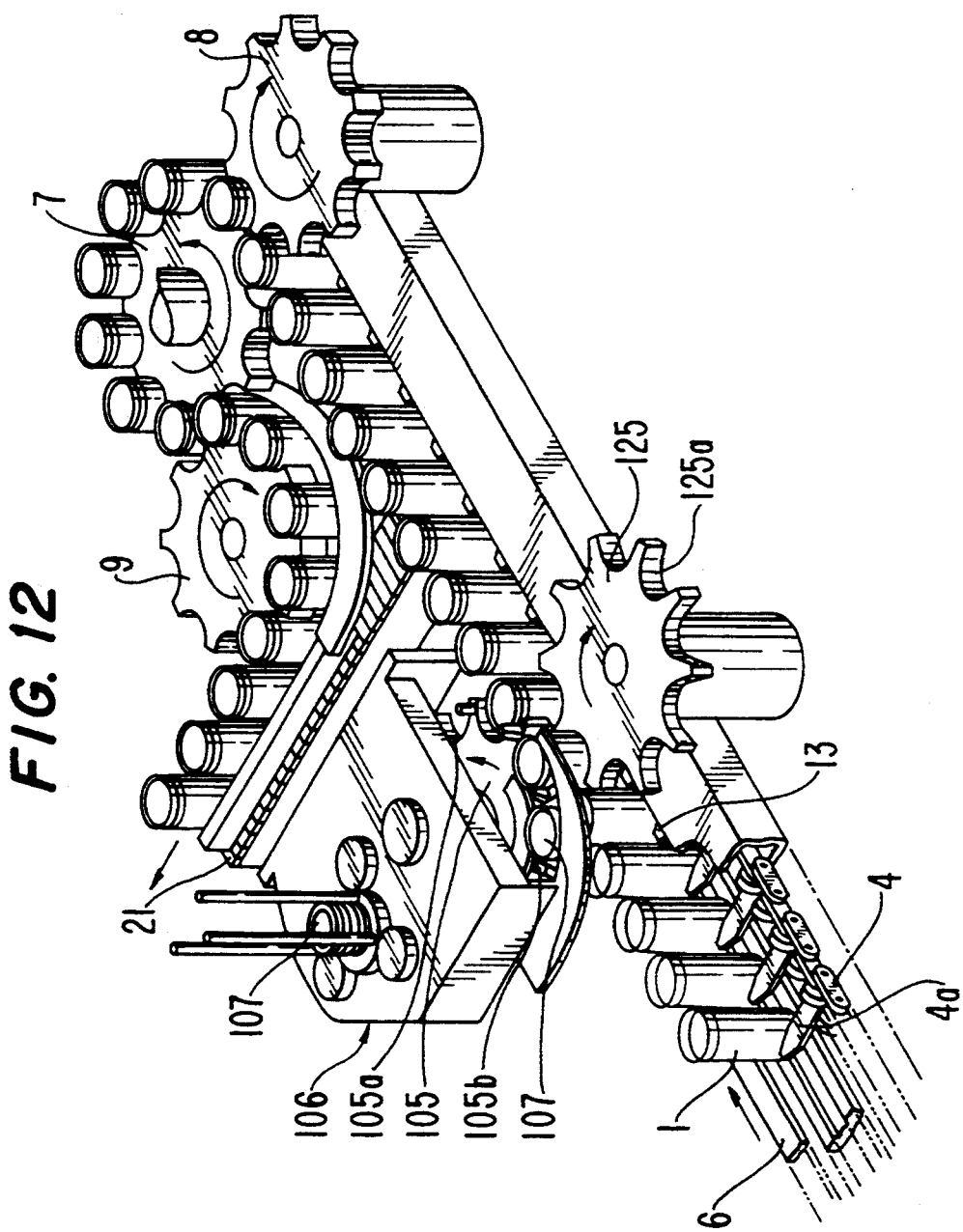
FIG. 12 is a perspective view of another preferred embodiment of a can seaming line according to the present invention.

It is to be noted that since the seaming line shown in FIG. 12 has the same members as the seaming line explained previously with reference to FIG. 3 except for an opposed turret of a can lid feeder, reference numerals for the respective members are designated by reference numerals like those used in FIG. 3.

A can body 1 filled with a beverage by a can filler (not shown) is conveyed by a finger 4a of a drive chain in a can feed conveyor 4. The can body 1 is then covered with a can lid 107 in a can lid feed mechanism 106, and is conveyed to a can seamer in that state. The can body 1 is correctly centered in a seaming turret 7 with the aid of an opposed turret 8, seamed while being rotationally conveyed, and is subsequently moved to an ejection conveyor 21 via an ejection turret 9.

In the can lid feed mechanism 106, can lids 107 are separated from each other one-by-one by means of a separator (not shown) as synchronized with the timing of the traveling can bodies. Each can lid 107 is conveyed by a can lid feed claw 105b, mounted to a tooth end of a can lid feed turret 105, onto the top of a traveling can body 1 and covers the can body. The can lid feed turret 105 has at its circumference a large number of can pockets 105a for holding cans, which are arranged at the same pitch as or at a somewhat larger circumferential pitch than the pitch of the fingers 4a of the can conveyor 4. The can lid feed turret 105 also rotates synchronously with the feeding of the can bodies 1 by the fingers 4a such that the can lids are received in the can pockets 105a in synchronization with the can bodies. An extension of a semicircular portion of the can pocket 105a is in the form of a cycloid to prevent interference with the can body.

Reference numeral 125 designates an opposed turret which has can pockets 125a similar to the can lid feed turret 105, which is disposed symmetrically to the turret 105 with respect to a can feed conveyor 4, and which rotates in the opposite direction but at the same speed as the turret 103 so that the can pockets 125a are timed to confront the can pockets 105a. In addition, similar to the can lid feed turret 105, an extension of the semicircular portion of each of the can pockets 125a is in the form of a cycloid (in practice, the profile of the extension is an envelope of curves traced by the circumference of a circle having a radius equal to the radius of the pocket, when the center of the circle has moved along a cycloids intersecting pitch circle of the turret at the centers of circles coincident with the pocket of the turret, but for the sake of convenience, this envelope is referred to merely as a "cycloid").

Figure 13:
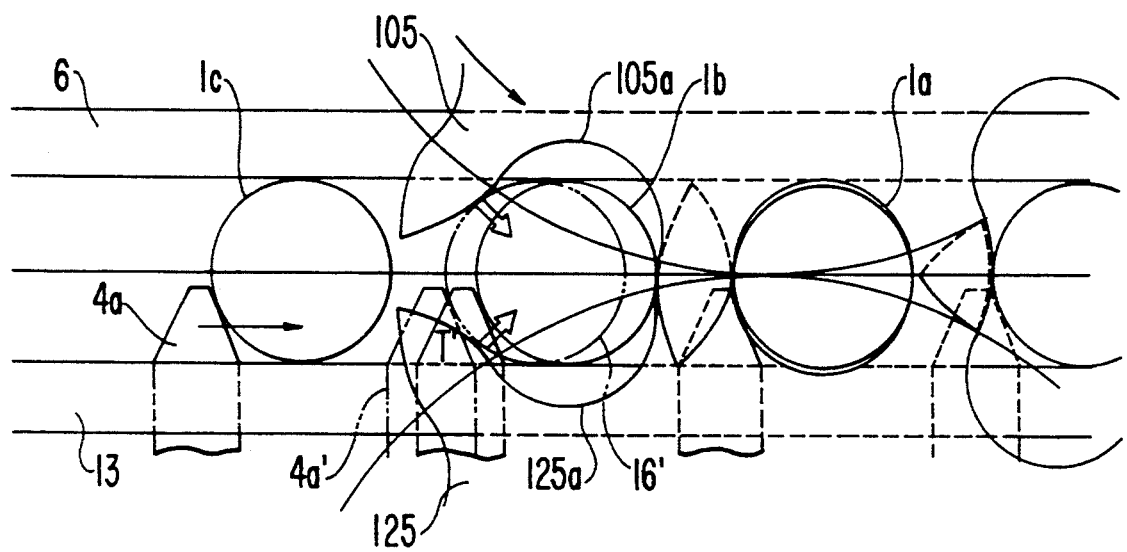
FIG. 13 is a plan view of a can delivery centering section of the can seaming line shown in FIG. 12.

In operation, a can body 1 conveyed by the can feed conveyor 4 is received in a can pocket 105a of the can lid feed turret and in the can pocket 125a of the opposed turret 125 as shown in FIG. 13. When the fingers 4a are conveying the can bodies 1 at a correct pitch, (as depicted by the solid lines), the can body 1b smoothly enters the can pockets 105a and 125a of the turrets as constrained by the inclined portion of the finger 4a, the can guide 6, and the cycloidal portions of the turrets 105 and 125, and is centered.

However, when the pitch of the fingers has deviated from a predetermined pitch due to an error in the pitch of the links of the drive chain, the finger and the can body would assume the state depicted by double-dot chain lines and denoted by reference numerals 4a' and 1b'. In this state, the teeth of the turrets 105 and 125 would enter the can passageway and push the can body 1 as overriding the finger 4a'. However, because the angle formed between line tangent to the can body, at the points of contact with the turrets 105, 125, would be obtuse, the teeth of the turrets would not bite into the can body. The can body 1 would smoothly enter the can pockets 105a and 125a of the turrets as pushed by the faces of the teeth in the form of a cycloid, and would be correctly centered. It is to be noted that if a deep groove is formed along the outer periphery of the turret 105 and if the teeth of the opposed turret 125 are disposed so as to pass into the groove, then even if the can should be pushed by the turrets, no torque would upset the can bodies.

As described in detail above, according to this preferred embodiment of the present invention, because the centering of the can bodies is not influenced by an error in the pitch of the fingers of a can conveyor, the can lids are accurately delivered to cover the can bodies, the can bodies passing through the can lid feeder are smoothly delivered, and therefore, a stable conveying condition is realized in which neither the spilling of the beverage nor damage to the can bodies occur.

While a principle of the present invention has been described above in connection with a number of preferred embodiments of the invention, it is intended that all matter contained in the above description and illustrated in the accompanying drawings be interpreted as illustrative of the invention and not in a limiting sense.

We claim:

1. A can feeding apparatus comprising: opposed can guides defining a can passageway therebetween; a rail in the form of a plate delimiting the bottom of said can passageway; a conveyor including a drive chain and a plurality of fingers fixed to said drive chain and extending into said can passageway, the fingers moving along said can passageway to push can bodies in the can passageway along said rail toward an end of said passageway when said conveyor is driven; a seaming turret and a turret opposed thereto located at the end of said can passageway so as to receive can bodies pushed by the fingers of said conveyor, each of said turrets having a plurality of teeth at the outer periphery thereof, the teeth of at least one of said turrets including first portions defining can body-receiving recesses therebetween and claws extending from said first portions, respectively, radially outwardly of the pitch circle of the at least one turret, each of said claws having a surface extending contiguously from a surface of a said first portion forming a leading end of a said can body-receiving recess with respect to a direction of rotation of the at least one turret, and each said surface of the claws having a profile of a cycloid.

2. A can feeding apparatus as claimed in claim 1, and further comprising a motor having a rotary drive shaft, a drive flange integral with said drive shaft so as to rotate therewith, a sprocket about which the drive chain of said conveyor is wrapped, said sprocket being mounted to said drive flange, and a phase adjusting mechanism by which the rotational position of said sprocket relative to said drive flange can be adjusted, said phase adjusting device including an eccentric pin threaded to said drive flange, a phase adjusting plate, a pin detachably securing said phase adjusting plate to said sprocket, said phase adjusting plate being engageable with said eccentric pin such that rotation of said eccentric pin when engaged with said phase-adjusting plate adjusts the rotational position of said sprocket relative to said drive flange.

3. In a production line including a can seamer having a seaming turret and a can lifter supporting can bodies in the seaming turret, a can feeding apparatus comprising: opposed can guides having guiding surfaces, respectively, defining a can passageway therebetween terminating at the can lifter of the can seamer, one of said can guides having a portion adjacent the can lifter and seaming turret of the can seamer; a rail in the form of a plate delimiting the bottom of said can passageway; a conveyor including a drive chain and a plurality of fingers fixed to said drive chain and extending into said can passageway, the fingers moving along said can passageway to push can bodies in the can passageway to the can lifter at an end of said passageway when said conveyor is driven; and a magnet mounted to said portion of said one of the can guides at the end of said passageway adjacent the can lifter, said magnet being flush with the guiding surface of said one of said can guides.

4. A can feeding apparatus in a production line as claimed in claim 3, and further comprising a brush mounted to the other of said can guides adjacent the end of said can passageway, said brush extending into said passageway such that can bodies being guided along said other of said can guides will be pushed by the brush horizontally in a direction at right angles to the direction in which can bodies are conveyed by the conveyor.

5. A can feeding apparatus in a can production line as claimed in claim 4, and further comprising a motor having a rotary drive shaft, a drive flange integral with said drive shaft so as to rotate therewith, a sprocket about which the drive chain of said conveyor is wrapped, said sprocket being mounted to said drive flange, and a phase adjusting mechanism by which the rotational position of said sprocket relative to said drive flange can be adjusted, said phase adjusting device including an eccentric pin threaded to said drive flange, a phase adjusting plate, a pin detachably securing said phase adjusting plate to said sprocket, said phase adjusting plate being engageable with said eccentric pin such that rotation of said eccentric pin when engaged with said phase-adjusting plate adjusts the rotational position of said sprocket relative to said drive flange.

6. A can feeding apparatus in a can production line as claimed in claim 3, and further comprising a motor having a rotary drive shaft, a drive flange integral with said drive shaft so as to rotate therewith, a sprocket about which the drive chain of said conveyor is wrapped, said sprocket being mounted to said drive flange, and a phase adjusting mechanism by which the rotational position of said sprocket relative to said drive flange can be adjusted, said phase adjusting device including an eccentric pin threaded to said drive flange, a phase adjusting plate, a pin detachably securing said phase adjusting plate to said sprocket, said phase adjusting plate being engageable with said eccentric pin such that rotation of said eccentric pin when engaged with said phase-adjusting plate adjusts the rotational position of said sprocket relative to said drive flange.

7. In a production line including a can seamer having a seaming turret and a can lifter supporting can bodies in the seaming turret, and a can lid feeding mechanism disposed upstream of the can seamer and feeding can lids one-by-one onto can bodies, a can feeding apparatus comprising: opposed can guides having guide surfaces, respectively, defining a can passageway passing by the can lid feeding mechanism and terminating at the can lifter of the can seamer; a rail in the form of a plate delimiting the bottom of said can passageway; a conveyor including a drive chain and a plurality of fingers fixed to said drive chain and extending into said can passageway, the fingers moving along said can passageway to push the can bodies in the can passageway along said rail through the can lid feeding mechanism and to said can seamer when the conveyor is driven; a can body centering device disposed adjacent the can lid feeding mechanism and which centers can bodies relative to the mechanism so that the can bodies will each receive a lid thereon from the can lid feed mechanism, said can body centering device including a can lid feed turret and a first opposed turret opposed thereto, said can feed passageway extending between said turrets, said can lid feed turret having a plurality of teeth at the outer periphery thereof, the teeth including first portions defining pockets spaced in the circumferential direction of the can lid feed turret at a pitch at least equal to the pitch at which the fingers of said conveyor are spaced, and said first opposed turret including a first outer circumferential portion having surfaces in the shape of circular arcs to define pockets at the outer periphery of the first opposed turret, and projecting portions having surfaces extending contiguously to said surfaces in the shape of circular arcs and radially outwardly of the pitch circle of the first opposed turret, the surfaces of said projecting portions having profiles of cycloids; a drive mechanism operatively connected to said conveyor, to said can lid feed turret and to said first opposed turret so as to drive said conveyor to move the fingers along said passageway, rotate said can lid feed turret in a first rotational direction in synchronization with said conveyor, and rotate said first opposed turret at the same speed as said can lid feed turret and in a rotational direction opposite to said first rotational direction; a seaming turret and a second opposed turret opposed to said seaming turret, the seaming turret and the second opposed turret being located at the end of said can passageway so as to receive can bodies pushed by the fingers of said conveyor, each of said seaming and second opposed turrets having a plurality of teeth at the outer periphery thereof, the teeth of at least one of said seaming and second opposed turrets including first portions defining can body-receiving recesses therebetween and claws extending from said first portions, respectively, radially outwardly of the pitch circle of the at least one turret, each of said claws having a surface extending contiguously from a surface of a said first portion forming a leading end of a said can body-receiving recess with respect to a direction of rotation of the at least one turret, and each said surface of the claws having a profile of a cycloid.

8. A can feeding apparatus in a production line as claimed in claim 7, and further comprising a brush mounted to the other of said can guides adjacent the end of said can passageway, said brush extending into said passageway such that can bodies being guided along said other of said can guides will be pushed by the brush horizontally in a direction at right angles to the direction in which can bodies are conveyed by the conveyor.

9. In a production line including a can seamer having a seaming turret and a can lifter supporting can bodies in the seaming turret, and a can lid feeding mechanism disposed upstream of the can seamer and feeding can lids one-by-one onto can bodies, a can feeding apparatus comprising: opposed can guides having guide surfaces, respectively, defining a can passageway passing by the can lid feeding mechanism and terminating at the can lifter of the can seamer, one of said can guides having a portion adjacent the can lifter and the seaming turret of the can seamer; a rail in the form of a plate delimiting the bottom of said can passageway; a conveyor including a drive chain and a plurality of fingers fixed to said drive chain and extending into said can passageway, the fingers moving along said can passageway to push the can bodies in the can passageway along said rail through the can lid feeding mechanism and to said can seamer when said conveyor is driven; a can body centering device disposed adjacent the can lid feeding mechanism and which centers can bodies relative to the mechanism so that the can bodies will each receive a lid thereon from the can lid feed mechanism, said can body centering device including a can lid feed turret and a first opposed turret opposed thereto, said can feed passageway extending between said turrets, said can lid feed turret having a plurality of teeth at the outer periphery thereof, the teeth including first portions defining pockets spaced in the circumferential direction of the turret at a pitch at least equal to the pitch at which the fingers of said conveyor are spaced, and said first opposed turret including a first outer circumferential portion having surfaces in the shape of circular arcs to define pockets at the outer periphery of the first opposed turret, and projecting portions having surfaces extending contiguously to said surfaces in the shape of circular arcs and radially outwardly of the pitch circle of the first opposed turret, the surfaces of said projecting portions having profiles of cycloids; a drive mechanism operatively connected to said conveyor, to said can lid feed turret and to said first opposed turret so as to drive said conveyor to move the fingers along said passageway, rotate said can lid feed turret in a first rotational direction in synchronization with said conveyor, and rotate said first opposed turret at the same speed as said can lid feed turret and in a rotational direction opposite to said first rotational direction; and a magnet mounted to said portion of said one of the can guides at the end of said passageway adjacent the can lifter, said magnet being flush with the guiding surface of said one of said can guides.

10. A can feeding apparatus in a production line including a can seamer having a seaming turret and a can lifter supporting can bodies in the seaming turret, and a can lid feeding mechanism disposed upstream of the can seamer and feeding can lids one-by-one onto can bodies, a can feeding apparatus comprising: opposed can guides having guide surfaces, respectively, defining a can passageway passing by the can lid feeding mechanism and terminating at the can lifter of the can seamer; a rail in the form of a plate delimiting the bottom of said can passageway; a conveyor including a drive chain and a plurality of fingers fixed to said drive chain and extending into said can passageway, the fingers moving along said can passageway to push the can bodies in the can passageway along said rail through the can lid feeding mechanism and to said can seamer when the conveyor is driven; a can body centering device disposed adjacent the can lid feeding mechanism and which centers can bodies relative to the mechanism so that the can bodies will each receive a lid thereon from the can lid feed mechanism, said can body centering device including a can lid feed turret and a first opposed turret opposed thereto, said can feed passageway extending between said turrets, said can lid feed turret having a plurality of teeth at the outer periphery thereof, the teeth including first portions defining pockets spaced in the circumferential direction of the turret at a pitch at least equal to the pitch at which the fingers of said conveyor are spaced, and said first opposed turret including a first outer circumferential portion having surfaces in the shape of circular arcs to define pockets at the outer periphery of the first opposed turret, and projecting portions having surfaces extending contiguously to said surfaces in the shape of circular arcs and radially outwardly of the pitch circle of the first opposed turret, the surfaces of said projecting portions having profiles of cycloids; a drive mechanism operatively connected to said conveyor, to said can lid feed turret and to said first opposed turret so as to drive said conveyor to move the fingers along said passageway, rotate said can lid feed turret in a first rotational direction in synchronization with said conveyor, and rotate said first opposed turret at the same speed as said can lid feed turret and in a rotational direction opposite to said first rotational direction, said drive mechanism including a motor having a rotary drive shaft, a drive flange integral with said drive shaft so as to rotate therewith, a sprocket about which the drive chain of said conveyor is wrapped, said sprocket being mounted to said drive flange, and a phase adjusting mechanism by which the rotational position of said sprocket relative to said drive flange can be adjusted, said phase adjusting device including an eccentric pin threaded to said drive flange, a phase adjusting plate, a pin detachably securing said phase adjusting plate to said sprocket, said phase adjusting plate being engageable with said eccentric pin such that rotation of said eccentric pin when engaged with said phase-adjusting plate adjusts the rotational position of said sprocket relative to said drive flange.

* * * * *